United States Patent [19]
Naoi et al.

[11] 3,921,057
[45] Nov. 18, 1975

[54] DEVICE FOR CONTROLLING OUTPUT VOLTAGE OF AC MAGNETO GENERATOR

[75] Inventors: Keigo Naoi; Hiroshi Koike, both of Katsuta, Japan

[73] Assignee: Hitachi, Ltd., Japan

[22] Filed: Sept. 26, 1973

[21] Appl. No.: 400,740

[30] Foreign Application Priority Data
Sept. 29, 1972 Japan............................ 47-97042

[52] U.S. Cl. .................. 322/8; 315/78; 320/12; 320/71; 322/28; 322/91
[51] Int. Cl.² ........................... H02J 7/; H02P 9/13
[58] Field of Search ............ 322/22, 24, 28, 45, 89, 322/90, 91, 1, 7, 8; 320/61, 62, 71, 72, 10–12; 310/70 R, 153; 315/82, 83, 78

[56] References Cited
UNITED STATES PATENTS

| | | | |
|---|---|---|---|
| 3,491,285 | 1/1970 | Nowakowski | 322/28 X |
| 3,668,514 | 6/1972 | Peck | 322/28 |
| 3,710,228 | 1/1973 | Higashino | 320/72 X |
| 3,757,199 | 9/1973 | Minks | 322/28 |
| 3,769,567 | 10/1973 | Cox | 322/91 X |

FOREIGN PATENTS OR APPLICATIONS
1,300,640   6/1962   France ................................. 315/78

*Primary Examiner*—J. D. Miller
*Assistant Examiner*—Robert J. Hickey
*Attorney, Agent, or Firm*—Craig & Antonelli

[57] ABSTRACT

In a control device for controlling the output voltage of an ac magneto generator, a battery is connected through a rectifier with the output coil of the magneto generator and a lamp as a load is also connected through a switch with the output coil of the generator. A thyristor is connected between the terminals of the output coil in order to control the output voltage of the generator. The control signal applied to the control electrode of the thyristor is controlled by the voltage of the battery when the switch is open, and by the voltage across the lamp when the switch is closed.

14 Claims, 8 Drawing Figures

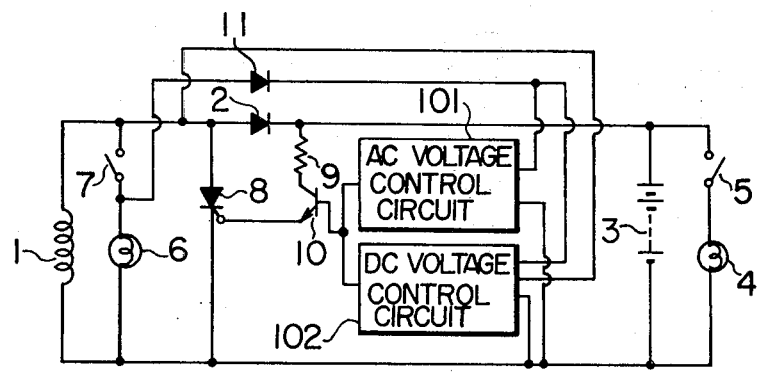
F I G. 4
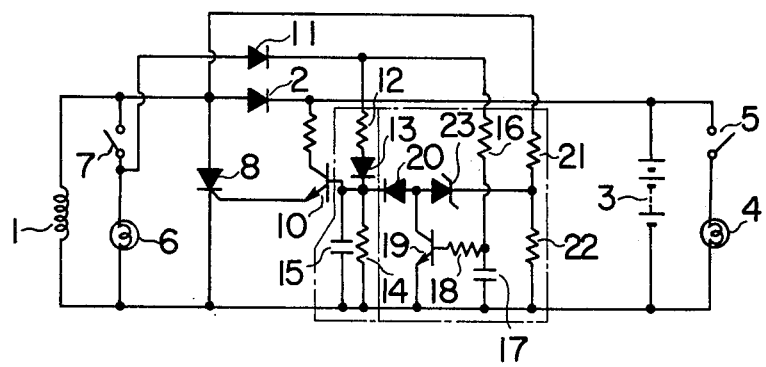
F I G. 5

DEVICE FOR CONTROLLING OUTPUT VOLTAGE OF AC MAGNETO GENERATOR

The present invention relates to a device for controlling the output voltage of an ac magneto generator which is rotated at various speeds.

A magneto generator having a permanent magnet as a rotor is generally used in an automobile equipped with a small-capacity engine.

A flywheel magneto is a smaller example of such a magneto generator and it is widely used in the field of small-powered autobicycles. The flywheel magneto consists mainly of an ignition system and a generator system. In the flywheel magneto, the voltage induced across the coil of the generator system varies as the rotational speed changes, so that the voltages to light lamps and to charge the battery are low at a low rotational speed and high at a high rotational speed. And this is one of the drawbacks of the conventional magneto generator. Of course, this drawback can be eliminated by causing the battery to supply power for all the lamps and then by controlling the voltage of the battery. In such a case, however, when the output of the generator is small, the discharge current from the battery to the lamps becomes excessive to cause the battery to overdischarge. In order to prevent the overdischarging of the battery, therefore, an artifice is employed in which head lamps and tail lamps usually lit only after dark are directly connected with the armature coil of the generator while stop lamps and direction indicating lamps used night and day are fed by the battery. With this type of circuit, it is preferable to separately provide a control means to control the voltages of the lamps lit after dark and a control means to control the battery voltage, but the provision of the separate control means is difficult from the standpoint of technique as well as cost.

Further, the conventional device for controlling the output voltage of a magneto generator has a drawback that if the lamp voltages are accurately controlled then the battery voltage cannot be accurately controlled though it is much improved as compared with the case of the absence of the lamp voltage control. This drawback gives rise to the problem of the overcharging of the battery since the voltage of the battery is adjusted high during the drive by day.

Moreover, the conventional control device has a drawback that if the voltage of the battery is accurately controlled then the lamp voltages are adjusted low at the low rotational speed, that is, the lamps are dim during the low speed drive.

Therefore, some of the conventional magneto generators are used with the output powers below their ratings so as to reduce the difference in output power between the low and high rotational speeds while others are used with an auxiliary output coil incorporated in each of them which coil serves to deliver generated power only when the lamps are to be lit but is disconnected from the load circuit when the lamps are not used. Nevertheless, such generators cannot be free from the disadvantages that the generating efficiency is poor, that the size is large and that the regulation of the fluctuation of the output power is not yet satisfactory.

One object of the present invention is to provide a voltage control device which can be easily fabricated and which has an excellent characteristic.

Another object of the present invention is to provide a voltage control device not only which can keep the voltage applied to an ac electric load constant when the load is connected in the load circuit but also which can exhibit an excellent charging characteristic.

According to the present invention which has been made to attain the above mentioned objects, a battery is connected through a rectifier with the output coil of the generator while a lamp as a load is connected through a switch with the same coil, a thyristor is connected between the terminals of the output coil so that the voltage across the output coil, i.e. output power, is controlled according to the conduction and the cut-off of the thyristor, and the control circuit to control the thyristor has two voltage detecting means to control the thyristor by the voltage of the battery when the switch associated with the lamp is open and by the voltage across the lamp when the switch is closed.

The foregoing and other objects and features of the present invention will be apparent from the following description of the specification when it is read in conjunction with the accompanying drawings, in which:

FIG. 4 is a circuit of another embodiment of the present invention;

FIG. 5 is a more particular example of the circuit shown in FIG. 4;

Throughout the drawings the same reference numerals and characters are applied to like parts or circuit elements.

Figure 1:
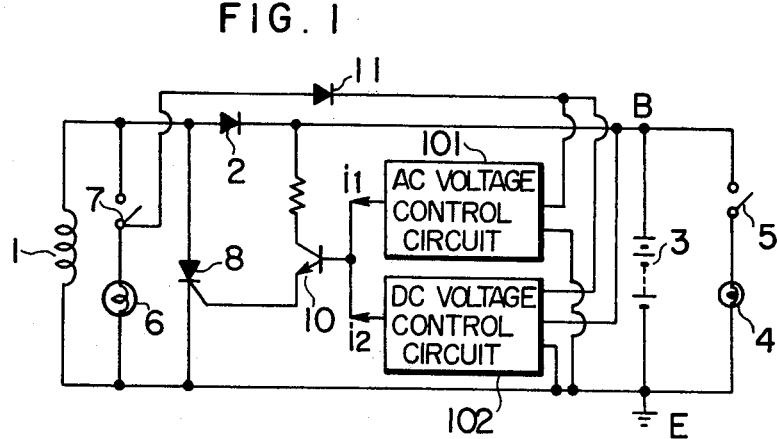
FIG. 1 is a circuit of a voltage control device for a magneto generator as one embodiment of the present invention.

In FIG. 1, one end of the armature coil 1 of a magneto generator is connected through a rectifier 2 with the positive terminal of a battery while the other end of the armature coil 1 is connected with the negative terminal of the battery 3. The energization of lamp 4 powered by the battery 3 is controlled by a switch 5 and the energization of a lamp 6 powered from the armature coil 1 is controlled by a switch 7. A thyristor 8 having a control electrode is connected between the terminals of the armature coil 1, the anode of the thyristor 8 being connected with the one end of the armature coil 1 which is connected with the positive terminal of the battery 3 and the cathode of the thyristor 8 with the other end of the armature coil 1 which is connected with the negative terminal of the battery 3. The control electrode of the thyristor 8 is connected through a transistor 10 and a resistor 9 with the battery 3. The base of the transistor 10 is connected both with an ac voltage control circuit 101 which is actuated when the switch 7 is closed and with a dc voltage control circuit 102 for the battery 3 which is actuated when the switch 7 is open. The control circuit 101 has two output terminals one of which is connected through a diode 11 with one end of the switch 7 directly connected to the lamp 6 and the other of which is connected with the negative terminal of the battery 3. The control circuit 102 has three output terminals, the first of which is connected through the rectifier 11 with the one end of the switch 7, the second of which is connected with the positive terminal of the battery 3 and the third of which is connected with the negative terminal of the battery 3.

In this circuit, when the switch 7 is closed, the current $i_2$ flowing from the control circuit 102 to the base of the transistor 10 vanishes so that the current $i_1$ controlled by the circuit 101 for controlling the terminal voltage of the lamp 6 flows into the base of the transistor 10 to control the voltage across the lamp 6. On the other hand, when the switch 7 is opened, the current flowing through the diode 11 into the circuit 101 vanishes so that the current $i_1$ vanishes and the circuit 102 operates to control the voltage of the battery 3.

Figure 2:
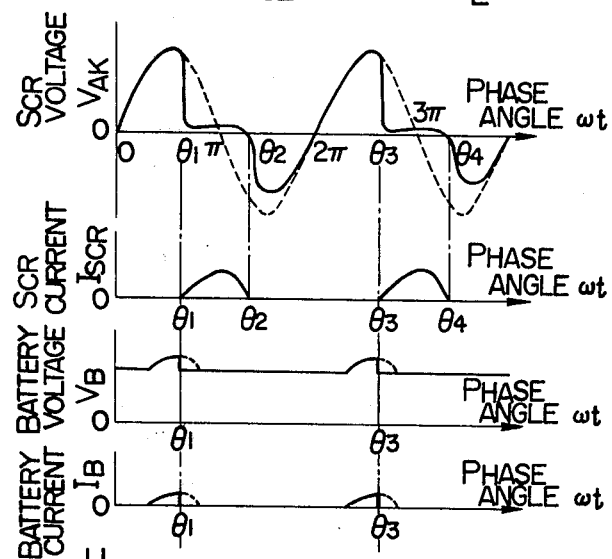
FIG. 2 shows, in turn from the top to the bottom, the waveforms of voltages applied to the thyristor used in the circuit shown in FIG. 1, the current flowing through the thyristor, the terminal voltage of the battery and the current flowing through the battery.

The operation of the thyristor 8 will be described with the aid of FIG. 2. The output voltage $V_{AK}$ of the magneto generator to be applied to the thyristor 8 has not an exactly sinusoidal waveform but it is assumed for the sake of simplicity that it has such a sinusoidal waveform as represented partially by the solid curve and partially by the dotted curve in FIG. 2. If the switch 7 is closed, the transistor 10 starts operation at the instant when the phase angle $\omega t = \theta_1$ to render the thyristor (SCR in FIG. 1) 8 on. Then, the output voltage of the magneto generator applied across the lamp 6 is reduced nearly to zero so that the output voltage is not applied to the battery 3. When the phase angle $\omega t$ advances to $\pi$, the thyyristor 8 starts being reversely biassed so that the thyristor 8 is to be cut off. But the thyristor 8 maintains its conductive state due to the reactance of the armature coil 1 so that the thyristor 8 controls the power between the phase angles $\pi$ and $2\pi$. If the armature coil 1 has no reactance component, the generated power itself is impressed on the lamp 6 for the phases $\pi$ to $2\pi$. Actually, however, the current flowing through the thyristor 8 exists for $\omega t = \theta_1$ to $\theta_2$, and the current affects both the positive and the negative portions of the sinusoidal waveform. Therefore, if the thyristor 8 is controlled according to the voltage of the battery 3 only, the lamp voltage or the power consumed by the lamp 6 varies depending upon the charged state of the battery 3, namely the terminal voltage of the same. If the battery 3 is sufficiently charged, $\theta_1$ approaches zero while $\theta_2$ draws near $2\pi$ so that the lamp becomes very dim. If, on the other hand, the battery 3 is insufficiently charged, both $\theta_1$ and $\theta_2$ approach $\pi$ so that the lamp is overpowered to be exposed to the danger of its being burnt out. It is, therefore, preferable to control the thyristor 8 by the terminal voltage of the battery 3 when the switch 7 is open and by the applied voltage across the lamp 6 when the switch 7 is closed.

Figure 3:
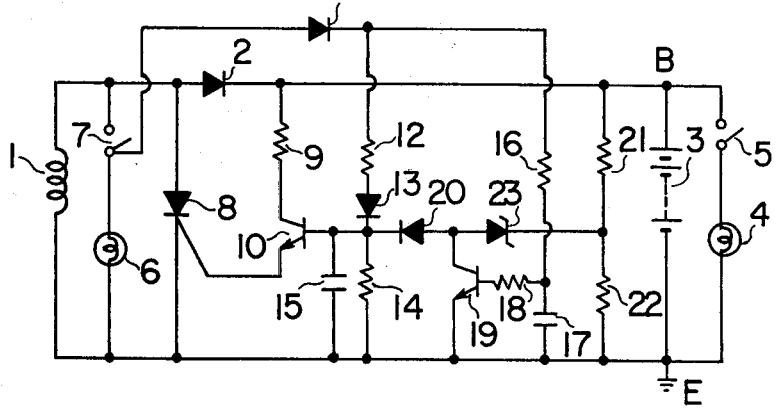
FIG. 3 is a more particular example of the circuit shown in FIG. 1.

FIG. 3 is a more particular example of the circuit shown in FIG. 1. In FIG. 3, a resistor 12, a diode 13, a resistor 14 and a capacitor 15 connected in parallel to the resistor 14 constitute the circuit 101 shown in FIG. 1, which detects the voltage across the lamp 6 and controls the base current of the transistor 10. A resistor 16, a capacitor 17, a resistor 18, a transistor 19 and a diode 20 form a part of the circuit 102 shown in FIG. 1, which serves to block the current $i_2$ flowing from the circuit 102 when the switch 7 is closed. Namely, when the switch 7 is closed, a current flows into the base of the transistor 19 through the diode 11 and the resistors 16 and 18, which transistor 19 is in turn rendered conductive to reduce the current flowing through the diode 20 to be zero. The circuit which consists of resistors 21 and 22 and a Zener diode 23 forms the other part of the circuit 102, which serves to detect the voltage of the battery 3 so as to control the base current $i_2$ of the transistor 10, while the cathode and anode of the diode 20 are connected respectively with the base of the transistor 10 and the battery voltage detecting current. This control circuit 102 operates only when the switch 7 is open and the current flowing through the diode 11 ceases.

The function of the diode 13 is as follows: If it were not for the diode 13, a current would flow, when the switch 7 is open, into the base of the transistor 19 through a path consisting of the resistor 21, the Zener diode 23, the diode 20, the resistor 12, the resistor 16, and the resistor 18 to render the transistor 19 conductive. The diode 13 serves to prevent the transistor 19 from being thus rendered conductive.

Figure 6:
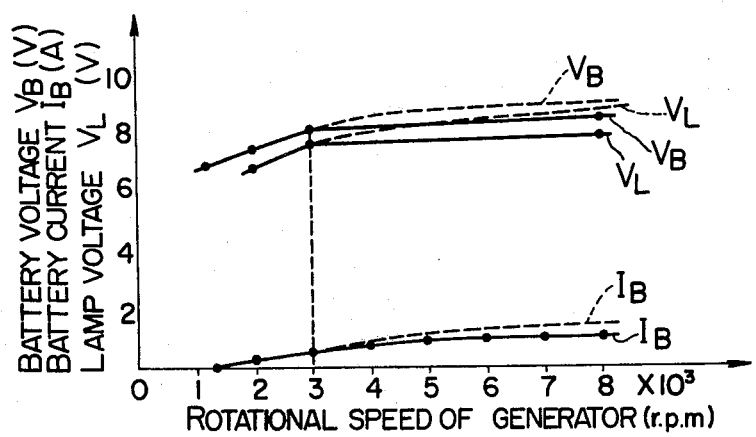
FIG. 6 and FIG. 7 show the characteristics of the control device according to the present invention.
Figure 7:
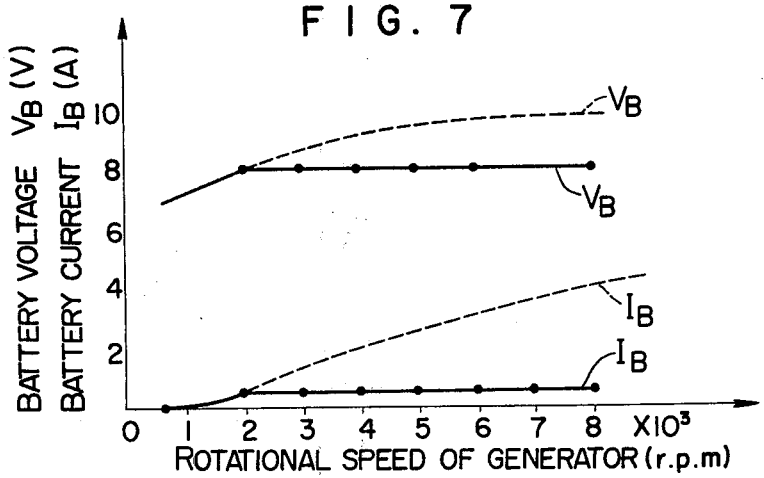

FIGS. 6 and 7 show the characteristics of the control device according to the present invention.

FIG. 6 shows the relationships of the battery voltage $V_B$, the battery current $I_B$ and the lamp voltage $V_L$ to the rotational speed in rpm of the generator in case where the switch 5 is open and the switch 7 is closed to light the lamp 6. In this figure, the solid curves represent the characterisitics of the device according to the present invention and the dotted curves correspond to those of the conventional control device.

It is seen from FIG. 6 that whereas the lamp voltage $V_L$ varies largely depending upon the rotational speed according to the conventional control device, the lamp voltage $V_L$ controlled by the present control device levels off above 3000 rpm and that the brightness of the lamp remains constant with the result that the useful life of the lamp is prolonged. Moreover, the voltage and the current of the battery almost level off above 3000 rpm so that the overcharging of the battery can be prevented.

FIG. 7 shows the relationships of the battery voltage $V_B$ and the battery current $I_B$ to the rotational speed of the generator. In this figure, the solid curves represent the characteristics of the control device according to the present invention while the dotted curves corresponds to those of the conventional control device.

It is seen from FIG. 7 that whereas the battery voltage and current vary very much depending upon the rotational speed according to the conventional control device, the battery voltage and current controlled by the present control device level off above 2000 rpm with a charging current of less than 0.5 A. Namely, a very excellent charging characteristic can be obtained according to the present invention whereas, with the conventional control device, there is a problem of the battery being overcharged.

FIG. 4 is a circuit of another embodiment of the present invention and FIG. 5 is a more particular example of the circuit shown in FIG. 4. The difference between FIGS. 1 and 4 is as follows: In FIG. 1, one of the terminals of the dc voltage detecting circuit 102 is directly connected with the positive terminal of the battery while, in FIG. 4, the corresponding terminal of the circuit 102 is connected with the junction point of the diode 2 and the thyristor 8 so as to detect the batter voltage plus the potential drop across the diode 2. Namely, in the circuit of FIG. 3, a leakage current always flows through the resistors 21 and 22 so that if the generator is kept resting for a long time then the battery will overdischarge while, in the circuit of FIG. 5, the diode 2 blocks such a leakage current.

If the amount of the charges stored in the battery 3 can be detected, the charging current flowing into the battery 3 can be controlled. Namely, the voltage control is possible by detecting the voltage at the terminal of the battery or by detecting the voltage at the anode of the diode 2.

As described above, the control device according to the present invention is so designed to perform the ac voltage control when an AC load is connected with the output terminals of the generator and to perform the control of the battery voltage when no ac load is connected. Accordingly, with the present control device, a stable output can be produced even if the rotational speed of the generator fluctuates, so that an excellent charging characteristic can be obtained.

Figure 8:
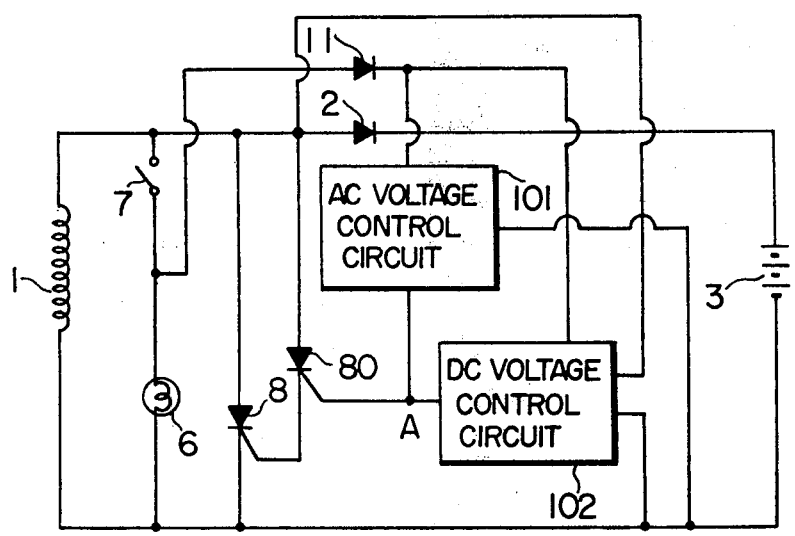
FIG. 8 is an alteration of the circuit shown in FIG. 4, only a difference being a second thyristor used in place of the transistor.

In the circuits in FIGS. 1, 3, 4 and 5, the gate of the thyristor 8 is controlled by the transistor 10, but the transistor 10 is not the sole device to drive the thyristor 8 but may be replaced by a switching element such as a Zener diode or an SCR. FIG. 8 is a modified circuit in which the transistor 10 is replaced by a thyristor 80.

When the switch 7 is closed, the voltage across the output coil 1 is applied to the lamp 6 and further to the battery 3 through the diode 2. The voltage applied to the lamp 6 is detected by the control circuit 101 and when the lamp voltage reaches the predetermined value, the thyristor 80 is rendered on to drive the thyristor 8 into conduction. When the switch 7 is open, the control circuit 102 operates to detect the voltage of the battery 3 and the thristor 80 is turned on to render the thyristor 8 conductive according to the charged state of the battery 3. In the circuit of FIG. 8, the thyristor 8 can be operated also by connecting the junction point A of the control circuits 101 and 102 with the gate of the thyristor 8, but in such a case the operation of the thyristor 8 will be somewhat unstable. In the circuits in FIGS. 3 and 5, the Zener diode 23 serves to make the operation of the transistor 10 accurate, but the circuit of FIG. 8 can operate without such a Zener diode as the diode 23. In the absence of the Zener diode, however, the circuit has a degraded temperature characteristic and a poor stability in operation.

In the circuits in FIGS. 3 and 5, the capacitor 15 and the resistor 14 form a charging and discharging circuit; the transistor 10 is operated by the charges stored in the capacitor 15, i.e. the voltage developed across the capacitor 15, and thereafter the charges are released through the resistor 14.

What we claim is:

1. A voltage control device comprising an ac generator having an output coil, a lamp as a load connected through a switch with said output coil of said generator, a battery connected through a rectifying circuit with said output coil of said generator, a thyristor connected with the output terminals of said generator, and a control circuit to control said thyristor, wherein said control circuit has two voltage detecting means, the first of which detects the terminal voltage of said battery and the second of which detects the voltage applied to said lamp, and wherein said thyristor is controlled by the signal from said second voltage detecting means when said switch is closed and by the signal from said first voltage detecting means when said switch is open.

2. A voltage control device as claimed in claim 1, wherein said control circuit has a switching element to drive said thyristor and said switching element is controlled by said second voltage detecting means when said switch is closed and by said first voltage detecting means when said switch is open.

3. A voltage control device as claimed in claim 2, wherein the detecting terminal of said first voltage detecting means is connected with the terminal of said battery while the detecting terminal of said second voltage detecting means is connected between said lamp and said switch.

4. A voltage control device and claimed in claim 2, wherein the detecting terminal of said first voltage detecting means is connected between said rectifier and said output coil of said generator while the detecting terminal of said second voltage detecting means is connected between said lamp and said switch.

5. A voltage control device as claimed in claim 2, wherein said first voltage detecting means has a voltage divider consisting of resistors and the detecting terminal of said second voltage detecting means is connected through a diode with said voltage divider.

6. A voltage control device comprising an a.c. generator having an output coil, a lamp as a load connected through a switch with said output coil of said generator, a battery connected through a rectifying circuit with said output coil of said generator, a first control means which detects the voltage of said battery to deliver an output signal, a second control means which detects the voltage across said lamp to deliver an output signal, and a thyristor connected between the terminals of said output coil and being controlled by said output signals of said first and second control means, and wherein said first control means has a switching means so that said first control means ceases to deliver an output in response to the operation of said switching means when said switch is closed.

7. A voltage control device comprising:
an AC generator having an output coil;
a load lamp connected through a switch to said output coil of said AC generator;
a thyristor connected across said output coil of said AC generator;
a battery connected through rectifying means to said output coil of said AC generator;
first voltage detecting means for detecting an output voltage of said rectifying means to thereby detect the charging condition of said battery;
second voltage detecting means for detecting a voltage applied to said lamp;
first switching means for triggering said thyristor in response to respective outputs of said first and second voltage detecting means; and
second switching means for stopping the operation of said first voltage detecting means when the output of said AC generator is applied to said second voltage detecting means.

8. A voltage control device according to claim 8, wherein said first voltage detecting means includes voltage dividing resistors, said first switching means includes a first integrating capacitor connected to an input of said first switching means, the output of said second voltage detecting means is applied to the input of said first switching means, said second switching means includes a second integrating capacitor for integrating a voltage which is applied to said load lamp, an output of said voltage dividing resistors is reduced when said second integrating capacitor is applied with the voltage applied to said load lamp, and the output of said voltage dividing resistor is applied to the input of said first switching means through a diode which prevents an inverse current.

9. A voltage control device comprising:
an AC generator having an output coil;
a load and a switch connected in series across said output coil;
a battery and a rectifier connected in series across said output coil;
a controlled switching element having an input electrode, an output electrode and a control electrode, and having its input and output electrodes connected across said coil;
first control means, responsive to the voltage supplied to said load from said coil by way of said switch, for providing a first control signal to the control electrode of said controlled switching element;
second control means, responsive to the terminal voltage of said battery, for supplying a second control signal to the control electrode of said controlled switching element; and
an additional controlled switching element connected between said control electrode and the outputs of each of said first and second control means.

10. A voltage control device according to claim 9, wherein said first control means comprises first and second resistors and first and second diodes connected in series across said load, and a capacitor connected across said second resistor, the output of said first control means being derived from the junction of said capacitor, said second diode and said second resistor.

11. A voltage control device according to claim 9, wherein said second control means comprises a voltage divider network connected to one end of said rectifier and a switching circuit, responsive to the voltage across said voltage divider, for supplying a control signal to said additional controlled switching element.

12. A voltage control device according to claim 11, wherein said voltage divider network is connected to the junction of said rectifier and said battery.

13. A voltage control device according to claim 11, wherein said voltage divider network is connected to the junction of said rectifier and said coil.

14. A voltage control device according to claim 11, wherein said switching network comprises a Zener diode and a transistor circuit connected to said voltage divider and a diode connected between said Zener diode and said additional controlled switching element.

* * * * *